US011927499B2

(12) United States Patent
Ettenauer

(10) Patent No.: US 11,927,499 B2
(45) Date of Patent: Mar. 12, 2024

(54) LOAD MEASURING ARRANGEMENT, METHOD FOR PRODUCING SAID ARRANGEMENT AND LOAD MEASURING METHOD WHICH CAN BE CARRIED OUT WITH SAID ARRANGEMENT

(71) Applicant: Trafag AG, Bubikon (CH)

(72) Inventor: Tobias Ettenauer, Stuttgart (DE)

(73) Assignee: Trafag AG, Bubikon (CH)

( * ) Notice: Subject to any disclaimer, the term of this patent is extended or adjusted under 35 U.S.C. 154(b) by 54 days.

(21) Appl. No.: 17/253,964

(22) PCT Filed: Jun. 19, 2019

(86) PCT No.: PCT/EP2019/066265
§ 371 (c)(1),
(2) Date: Dec. 18, 2020

(87) PCT Pub. No.: WO2019/243448
PCT Pub. Date: Dec. 26, 2019

(65) Prior Publication Data
US 2021/0255049 A1 Aug. 19, 2021

(30) Foreign Application Priority Data

Jun. 21, 2018 (DE) .................... 10 2018 115 008.3
May 15, 2019 (DE) .................... 10 2019 112 795.5

(51) Int. Cl.
*G01L 3/10* (2006.01)
*G01L 9/16* (2006.01)
(52) U.S. Cl.
CPC ................ *G01L 9/16* (2013.01); *G01L 3/103* (2013.01)

(58) Field of Classification Search
CPC ... G01L 1/125; G01L 1/127; G01L 3/10–105; G01D 5/2046; G01N 27/72–92
See application file for complete search history.

(56) References Cited

U.S. PATENT DOCUMENTS 3,011,340 A 12/1961 Dahle
3,311,818 A 3/1967 Quittner
(Continued)

FOREIGN PATENT DOCUMENTS

DE 3031997 A1 3/1982
EP 0384042 A2 8/1990
EP 3051265 A1 8/2016

OTHER PUBLICATIONS

Hinz, G. et al., "Magnetoelastic Sensors" in "Sensors," VCH Verlagsgesellschaft mbH, pp. 97-152 (1989).

*Primary Examiner* — Tran M. Tran
(74) *Attorney, Agent, or Firm* — United One Law Group LLC; Kongsik Kim; Jhongwoo Peck

(57) ABSTRACT

In order to be able to carry out an accurate and simple contactless load measurement on test objects made from materials which are optimized with respect to the intended purpose thereof, the test object (14) and a load measuring apparatus for measuring a load on the test object, wherein the load measuring apparatus (12) has a magnetic field generating device (18) for generating a magnetic field in a measuring region (11) of the test object (14) and a first and a second magnetic field capturing device (20, 22) for capturing a magnetic field parameter which changes on account of the load, characterized in that the measuring region (11) has a layer (13) made of a ferromagnetic amorphous or nanocrystalline metal alloy with maximum particle sizes of less than 1 μm.

16 Claims, 5 Drawing Sheets

(56) References Cited

U.S. PATENT DOCUMENTS

Figure 1:
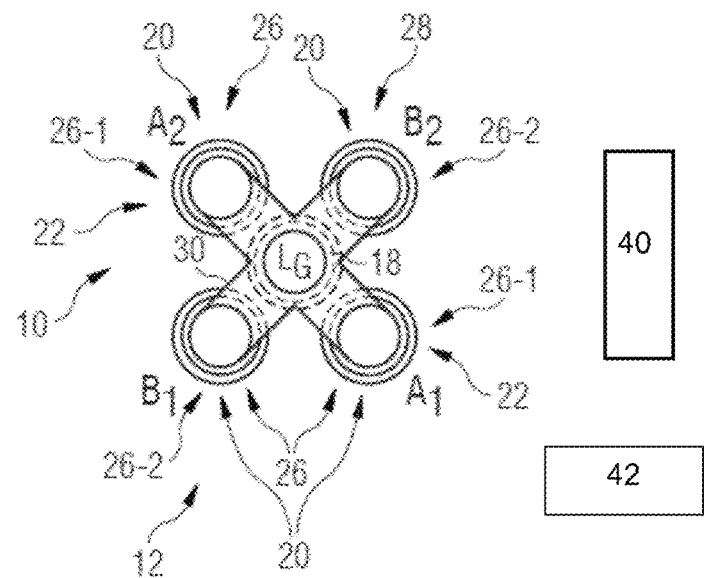

| | | | |
|---|---|---|---|
| 4,135,391 A | 1/1979 | Dahle | |
| 4,725,496 A * | 2/1988 | Tsuji | G11B 5/72 427/128 |
| 4,762,008 A * | 8/1988 | Kobayashi | G01L 3/102 73/862.336 |
| 4,840,073 A * | 6/1989 | Aoki | G01L 3/102 73/862.336 |
| 5,146,790 A | 9/1992 | Fish | |
| 5,193,267 A * | 3/1993 | Satoh | G01L 3/103 29/606 |
| 5,195,377 A * | 3/1993 | Garshelis | G01L 1/125 73/779 |
| 5,386,733 A * | 2/1995 | Hesthamar | G01L 1/127 73/779 |
| 5,484,469 A * | 1/1996 | Rutz | B22F 1/00 75/255 |
| 5,536,549 A * | 7/1996 | Nelson | C23C 28/322 204/192.1 |
| 5,557,974 A * | 9/1996 | Hase | G01L 3/102 73/862.333 |
| 5,675,886 A * | 10/1997 | Hase | H01F 1/15341 148/112 |
| 5,900,126 A * | 5/1999 | Nelson | C23C 28/34 427/523 |
| 6,053,989 A * | 4/2000 | Orillion | C22C 33/003 148/307 |
| 6,393,921 B1 * | 5/2002 | Grimes | G01L 9/16 73/728 |
| 6,494,102 B2 * | 12/2002 | Hanisko | G01L 3/102 73/779 |
| 7,261,005 B2 * | 8/2007 | Bunyer | G01L 3/105 73/728 |
| 7,744,703 B2 * | 6/2010 | Imai | C22C 45/02 148/403 |
| 7,988,798 B2 * | 8/2011 | Ozaki | H01F 1/15341 148/306 |
| 8,316,724 B2 * | 11/2012 | Ling | H01L 41/125 73/862.333 |
| 8,685,179 B2 * | 4/2014 | Tsuchiya | H01F 41/0226 148/403 |
| 8,968,891 B2 * | 3/2015 | Makino | H01F 10/131 428/836.3 |
| 8,986,469 B2 * | 3/2015 | Vecchio | C22C 1/002 148/330 |
| 9,234,811 B2 * | 1/2016 | Brummel | G01L 3/105 |
| 9,506,824 B2 * | 11/2016 | Motoe | H01L 41/20 |
| 9,793,336 B2 * | 10/2017 | Deligianni | H01L 23/53242 |
| 9,840,760 B2 * | 12/2017 | Kino | C22C 1/002 |
| 9,850,562 B2 * | 12/2017 | Urata | C22C 45/02 |
| 10,073,065 B2 * | 9/2018 | Balasubramaniam | B06B 1/08 |
| 10,247,627 B2 * | 4/2019 | May | G01L 3/101 |
| 10,444,096 B2 * | 10/2019 | May | G01L 1/142 |
| 10,577,692 B2 * | 3/2020 | DiMilia | C23C 18/168 |
| 11,183,350 B2 * | 11/2021 | Geffroy | C23C 18/1694 |
| 11,328,847 B2 * | 5/2022 | Harada | C22C 38/002 |
| 11,401,590 B2 * | 8/2022 | Harada | C22C 38/14 |
| 11,401,596 B2 * | 8/2022 | Nakano | B22F 9/02 |
| 11,402,237 B2 * | 8/2022 | Buchenau | G01P 3/49 |
| 2004/0084112 A1 * | 5/2004 | Verma | H01F 1/1475 148/105 |
| 2004/0154701 A1 * | 8/2004 | Lu | H01F 1/15316 148/403 |
| 2007/0034022 A1 | 2/2007 | Bunyer et al. | |
| 2012/0128970 A1 | 5/2012 | Motoe et al. | |
| 2018/0245994 A1 * | 8/2018 | May | G01L 25/00 |
| 2023/0074765 A1 * | 3/2023 | Ettenauer | G01N 3/066 |

* cited by examiner

LOAD MEASURING ARRANGEMENT, METHOD FOR PRODUCING SAID ARRANGEMENT AND LOAD MEASURING METHOD WHICH CAN BE CARRIED OUT WITH SAID ARRANGEMENT

CROSS-REFERENCES TO RELATED APPLICATIONS

This application is a National Stage Entry of International Application PCT/EP2019/066265 filed on Jun. 19, 2019, which claims priority from German Application 10 2019 112 795.5 filed on May 15, 2019 and German Application 10 2018 115 008.3 filed on Jun. 21, 2018. The aforementioned applications are incorporated herein by reference in their entirety.

The invention relates to a load measuring arrangement comprising a test object and a load measuring apparatus for measuring a load on the test object, said load measuring apparatus comprising a magnetic field generating device for generating a magnetic field in a measuring region of the test object and a first and a second magnetic field capturing device for capturing a magnetic field parameter which changes on account of the load. The invention also relates to a method for producing such a load measuring arrangement and to a load measuring method which can be carried out with said arrangement.

The invention relates in particular to a method and an arrangement for measuring a mechanical load at a test object. Loads are understood to be forces, torques or mechanical stresses on the test object.

Some exemplary embodiments of the invention relate in particular to a torque measuring arrangement comprising a torque transducer for a torque sensor for measuring a torque at a test object in the form of a shaft with the capture of changes in the magnetic field. Further, embodiments of the invention also relate to a measuring method for measuring a torque by capturing changes in the magnetic field. The torque transducer, the torque sensor and the torque measuring method are particularly designed for capturing changes in the magnetic field based on the Villari effect and even more particularly for magnetoelastic (=inverse magnetorestrictive) torque detection.

Such torque sensors, which detect torques in test objects such as shafts based on changes in the magnetic field, as well as the scientific background are described in the following literature:

D1 Gerhard Hinz and Heinz Voigt "Magnetoelastic Sensors" in "Sensors", VCH Verlagsgesellschaft mbH, 1989, pages 97-152
D2 U.S. Pat. No. 3,311,818
D3 EP 0 384 042 A2
D4 DE 30 31 997 A
D5 U.S. Pat. No. 3,011,340 A
D6 U.S. Pat. No. 4,135,391 A One type of torque transducer as described in particular in D4 (DE 30 31 997 A1), has proven to be particularly effective for measuring torques in shafts and at other measuring points.

Other embodiments are related to a pressure sensor with a membrane as a test object and with a stress capturing device for capturing mechanical stress in the membrane by active magnetization.

It is known that magnetic measurement methods can be applied to determine the physical measured values: torque, force and position on ferromagnetic objects. Usually, magnetoelastic (or also inversely magnetorestrictive) sensors or eddy current sensors are used for this purpose. The ferromagnetic materials that are used change their permeability under the influence of tensile or compressive stresses (also called Villari effect). A delimitation of the individual effects is usually difficult in practice; only the eddy current sensor is easier to distinguish from the other effects by its frequency dependence. In addition, the state of magnetization of the object is frequently not known or is strongly influenced by the processing and handling of the objects so that a broad industrial application is often difficult. Moreover, it is often not possible to predict the service life of the magnetized objects in a rather harsh environment in which this technology is used (for example but not exclusively in the field of electromobility, especially E-bikes, e.g. pedelecs, in heavy industry, in gearboxes, in hydraulic systems of construction machinery or in agricultural equipment).

From
D7 EP 3 051 265 A1
it is known to compensate this disadvantage by active magnetization by means of an alternating magnetic field in the kHz range. Generator and detector coils are used for this purpose, namely two first field detection coils A1, A2 and two second field detection coils B1, B2 and a central generator coil Lg in a cross arrangement (X arrangement). The difference of the coil pair A−B=(A1+A2)−(B1+B2) is determined in an analog signal processing scheme.

The invention is based on the object of designing a load measuring arrangement of the type described in the generic part of claim 1 in such a way that it is universally applicable.

To solve this object, the invention provides a load measuring arrangement according to claim 1. Also provided are a production method for producing such a load measuring arrangement and a method which can be carried out with such a load measuring arrangement.

Advantageous embodiments are the subject of the subclaims.

The invention provides a load measuring arrangement comprising a test object and a load measuring apparatus for measuring a load at the test object, wherein the load measuring apparatus has a magnetic field generating device for actively generating a magnetic field in a measuring region of the test object and a first and a second magnetic field capturing device for a capturing a magnetic field parameter which changes on account of the load, wherein the measuring region has a layer made of a ferromagnetic amorphous or nanocrystalline metal alloy having a maximum particle size of 1 μm.

For example, the ferromagnetic amorphous or nanocrystalline metal is a ferromagnetic metallic glass or a nanocrystalline coating such as electroless nickel.

It is preferred that the test object contains a body of non-ferromagnetic material which has a coating made of the ferromagnetic amorphous or nanocrystalline metal at least at the measuring region.

By the amorphous or nanocrystalline material layer it is possible in a particularly advantageous manner to measure loads such as torque or force utilizing the Villari effect (inverse magnetorestrictive effect) in test objects which are mainly formed from non-ferromagnetic materials. For example, it is thus possible to measure torque or force on shafts, struts or other components which are made of stainless steel, aluminum, plastic materials or fiber composite materials in a contactless manner.

Metallic glasses—also called amorphous metals—are metal or metal-and-non-metal alloys which do not have a crystalline structure, but rather an amorphous structure at the atomic level and yet exhibit metallic conductivity. A similar or equally good behavior is exhibited by metals that have only very small crystals at the atomic level in the nano range, smaller than 1 µm. Such metals with nanocrystals which have a maximum particle size of less than 1 µm (e.g. diameter) are here referred to as nanocrystalline metals. Nanocrystalline materials are particularly preferred. These also include chemically deposited nickel (with glass formers such as phosphorus for example). Electroless nickel with the phosphorus contents indicated in the embodiments is not yet completely amorphous.

The invention uses magnetic amorphous or nanocrystalline metals. Preferably, amorphous or nanocrystalline alloys of at least one glass former from the group including boron, silicon and phosphorus and at least one metal from the group including nickel, chromium, iron and cobalt are used. Many of these metallic glasses are magnetic, usually soft-magnetic (especially with non-dominance of cobalt), i.e. with low coercive field strength.

It is preferred that the amorphous or nanocrystalline metal is a metal alloy which includes at least one metal from the group of iron, nickel, cobalt and molybdenum.

It is preferred that the amorphous or nanocrystalline metal is a metal alloy which includes at least one glass former.

The glass former preferably is a glass former from the group of silicon, boron and phosphorus.

It is preferred that the proportion of glass formers is 2 to 30 atomic percent.

It is preferred that the amorphous or nanocrystalline metal includes or is electroless nickel having a phosphorus content of 2 to 11% by weight, preferably 5 to 9%. It is particularly preferred that the deposited electroless nickel has a phosphorus content of 2 to 11% by weight.

It is preferred that the amorphous or nanocrystalline metal is a metal alloy which contains 65 to 95 atomic percent of one or more metals from the group of iron, cobalt and nickel and 5 to 35 atomic percent of one or more glass formers from the group of silicon, boron and phosphorus.

It is preferred that the body is formed from or comprises a non-ferromagnetic material from the group of stainless steel, aluminum, plastic, fiber-reinforced plastic, GFRP, CFRP.

Particularly good results were achieved with a sensor, for example, which captures a load at a body, especially a torque at a shaft, wherein the body is made of chemically nickel-plated aluminum.

It is preferred that the layer of ferromagnetic amorphous or nanocrystalline metal is only partially provided on the test object. Here it is particularly preferred that the layer is formed continuously over the entire surface without interruptions in the surface, hence without a pattern in the surface so that a uniform magnetic field propagation over the surface is obtained.

It is preferred that the test object, if it consists of a ferromagnetic material, has a non-magnetic separating layer with good electrical conductivity between the body and the coating.

The coating allows to measure particularly loads at non-ferromagnetic test objects. But also test objects from or with ferromagnetic materials can achieve better measurement results through the coating. In this case, it is preferred to provide the separating layer between the ferromagnetic material of the body and the coating.

It is preferred that the test object is rotatable about a rotation axis relative to the load measuring apparatus.

For example, the test object can be a rotary shaft which is rotatable about a rotation axis and at which a torque is to be measured.

It is preferred that the magnetic field generating device is designed for actively generating a radial magnetic field in a measuring region of the test object. In particular, the magnetic field generating device can be easily integrated on a measuring head that points radially to the test object.

It is preferred that a first measuring region of the test object presents a layer of said amorphous or nanocrystalline metal which is uniformly continuous in the circumferential direction with respect to the rotation axis. Said layer of amorphous or nanocrystalline metal can, for example, be provided on a shaft around the entire circumference.

It is preferred that a second measuring region, which is axially displaced to the first measuring region in the direction of the rotation axis, has a layer of said amorphous or nanocrystalline metal which is provided only on a part of the circumference and/or presents a magnetic field-influencing material parameter that changes depending on the circumferential position.

By the amorphous or nanocrystalline metal being only partially applied to a circumferential region of the test object, an angle dependence of a magnetic field can be created that is induced in the test object by a magnetic field generating device or another magnetic field generating device on relative rotation of the test object and the load measuring apparatus. The angle dependence can be measured with one of the magnetic field capturing devices or with an additional coil that is provided or the like. Thus a combination sensor can be created which measures load or torque and, if necessary, also an angle of rotation.

Instead of a partial coating on the circumference, the layer in the second measuring region can also be applied with a magnetic field-influencing material parameter which changes depending on the circumference. For example, the material parameter can be a layer thickness or layer width or a material composition.

It is preferred that the load measuring apparatus comprises a sensor head.

It is preferred that the sensor head comprises a magnetic field generating coil, a first magnetic field measuring coil and a second magnetic field measuring coil in a V-arrangement.

It is preferred that the sensor head comprises a magnetic field generating coil and a first to fourth magnetic field measuring coil in an X-arrangement.

According to a further aspect, the invention provides a production method for producing a load measuring arrangement according to one of the preceding designs, the method comprising the steps of:
 a) providing a test object made of a non-ferromagnetic material or a ferromagnetic test object having a non-ferromagnetic electrically conducting separating layer,
 b) at least partially coating the test object with a ferromagnetic amorphous or nanocrystalline metal in order to create a measuring region,
 c) providing a load measuring apparatus having a magnetic field generating device for generating a magnetic field in the measuring region of the test object and a first and a second magnetic field capturing device for capturing a magnetic field parameter which changes on account of the load, and
 d) arranging the load measuring apparatus in the measuring region.

It is preferred that step b) comprises:
 b1) preferably chemically or galvanically depositing an alloy of at least one glass former and at least one metal having ferromagnetic properties on the test object, said separation taking place so quickly that an amorphous or nanocrystalline metal having a maximum particle size of less than 1 μm is formed.

It is preferred that step b) comprises:

b2) depositing electroless nickel having a phosphorus content of 2 to 12% by weight, preferably 5 to 9% by weight.

Electroless nickel is a chemical coating. It can be deposited as a wear or corrosion protection. Thus electroless nickel layers are formed. The difference to galvanic nickel is among others that no external electric current, e.g. from a rectifier, is used for the deposition, but that the electrons required for the separation (reduction) of the nickel ions are produced in the bath itself by means of a chemical oxidation reaction. In this manner, coatings are obtained in chemical nickel plating which present an accuracy of contour and the dimension of which can be in the range of 8 μm to 80 μm at a tolerance of ±2 μm to ±3 μm. Preferably, the deposition takes place at temperatures below 200°, more particularly less than 150°, even more particularly in the range of 90°. This means there is no need for rapid cooling.

Due to the deposition without external current it is also possible to coat electrically non-conducting bodies, e.g. those made of plastic like polyamide.

It is preferred that step b) comprises:

b3) coating with a layer thickness greater than 10 μm, particularly between 10 μm and 500 μm.

It is preferred that step b) comprises:

b4) coating a circumferential region of the test object which is all-round with respect to an axis of the test object.

It is preferred that step b) comprises:

b5) partially coating a circumferential region of the test object which is all-round with respect to an axis of the test object.

It is preferred that step b) comprises:

b6) producing a circumferential position signature at a circumferential position on the test object by partial application of the coating, by texturing the coating or by producing the coating with a magnetic field-influencing material parameter changed at this circumferential position.

It is preferred that step b) comprises:

b7) producing a two-dimensionally continuous layer without interruptions.

It is preferred that step b) comprises:

b8) depositing a metallic glass.

It is preferred that step b) comprises:

b9) depositing an alloy which at least includes one metal from the group of iron, nickel, cobalt and molybdenum.

It is preferred that step b) comprises:

b10) depositing an alloy which at least includes one glass former.

It is preferred that step b) comprises:

b11) depositing an alloy which at least includes one glass former from the group of silicon, boron and phosphorus.

It is preferred that step b) comprises:

b12) depositing an alloy including 2 to 30 atomic percent of at least one glass former, particularly from the group of silicon, boron and phosphorus.

It is preferred that step b) comprises:

b13) depositing an alloy which contains 65 to 95 atomic percent of one or more metals from the group of iron, cobalt and nickel and 5 to 35 atomic percent of one or more glass formers from the group of silicon, boron and phosphorus. Of course, also further alloy additives can be provided.

According to a further aspect, the invention relates to a load measuring method for measuring a load at a test object made from a non-ferromagnetic material, the method comprising:

coating at least one measuring region of the measured object with a ferromagnetic amorphous or nanocrystalline metal having a maximum particle size of less than 1 μm, actively generating a magnetic field in the measuring region, capturing a change in the magnetic field parameter on account of a load at the test object.

Preferably, the load measuring method is carried out with a load measuring arrangement according to one of the preceding designs.

Preferred embodiments of the invention relate to the idea of Metglas coating (Metglas-metallic glass, i.e. amorphous metal) or nanocrystalline coating for torque measurement, and to the combination of sensors.

For torque measurement with active magnetically inductive sensors it is currently inevitable to use materials which are ferromagnetic. Non-ferromagnetic materials such as stainless steel, aluminum, plastic, GFRP compounds cannot be used.

Preferred embodiments of the invention provide depositing a layer having ferromagnetic properties on these substrates. Metglas depositions as well as nanocrystalline metal depositions from nickel or chromium for example exhibit such properties. For example, the use of other materials than ferromagnetic materials allows reductions in weight of the work pieces that are used, or the test objects which are designed as shafts can be produced, for example, by an injection molding process.

Accordingly, shafts and also other test objects such as struts, gear elements, chainwheels etc. from other materials can be produced less expensively, and other dimensions can be realized.

It is also possible to apply the Metglas or nanocrystalline metal to the test object, e.g. a shaft, only partially. For example, a torque measurement can be performed at one location with Metglas/nanocrystalline metal and at another location on the shaft an additional signature for an angle measurement can be applied with Metglas/nanocrystalline metal. In embodiments of the invention, this texturing of the shaft can take place either by a subsequent removal of material, or the application of Metglas/nanocrystalline metal takes place, for example, only at dedicated locations.

A preferred embodiment of the invention provides a shaft coated with Metglas/nanocrystalline metal for torque measurements.

The measurement of torque at non-magnetic shafts is made possible by coating the shafts with ferromagnetic metallic glass (Metglas) or nanocrystalline metal.

As a material of the test object, e.g. shaft material, any non-ferromagnetic material can be used which can be provided with a well-adhering ferromagnetic Metglas/nanocrystalline coating. Preferably, provision should be made that the coating is not destroyed by the application of force.

The layer of amorphous or nanocrystalline metal can be applied on the outside for example. Since such layers are harder and more corrosion-resistant than other metals, they are very well suited as outer material. However, the layer can also be a layer underneath one or more top layers.

Preferred characteristics of the deposited material are discussed in the following.

The layer is preferably applied by deposition. The deposited material shall be ferromagnetic and amorphous or nanocrystalline (e.g. metallic glass). In one example, corresponding coatings are obtained by fast deposition of electroless nickel having a phosphorus content of 5-9% by weight, while subject to a very moderate heat treatment. Such a coating is not yet completely amorphous, but can still show crystals with particles sizes of less than 1 µm.

Preferably, a homogeneous closed layer is provided.

The good mechanical connection to the base substrate is beneficial.

Typical layer thicknesses of >10 µm, 30 µm, and 40 µm haven proven to be well suited in tests.

According to a preferred embodiment, the load measuring arrangement is a combination of a rotating test object, e.g. a shaft, a wheel, a gear, a chain ring or the like, and a torque sensor for measuring a torque at the test object. This embodiment can be applied, for example, to an E-bike, where the torque can be measured at the pedal crank or at an element provided with it. In this case, CFRP with a layer of Metglas or nanocrystalline metal can be used, for example.

In a further preferred embodiment, the load measuring arrangement is a pressure sensor having as a test object at least one membrane to which a to-be-measured pressure is applied and having a magnetoelastic stress capturing device for a magnetoelastic capture of mechanical stresses caused by the pressure application. In this case, the membrane can be made of stainless steel and can be coated with Metglas or nanocrystalline metal. Stainless steel has excellent characteristics in order to be used for a membrane, in particular corrosion resistance and elastic behavior. For further details concerning the design and the advantages of the pressure sensor, reference is explicitly made to German patent application DE 10 2017 104 547.3 which is herein incorporated by reference. All of the embodiments described therein can also be implemented using a membrane which is provided with a coating of ferromagnetic metallic material.

Figure 2:
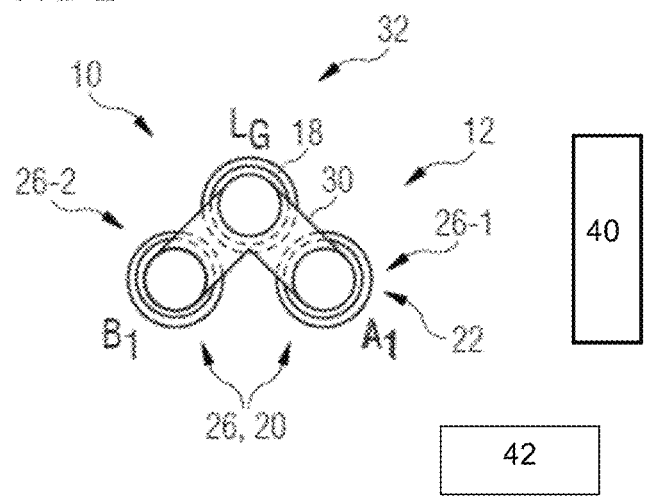
Figure 3:
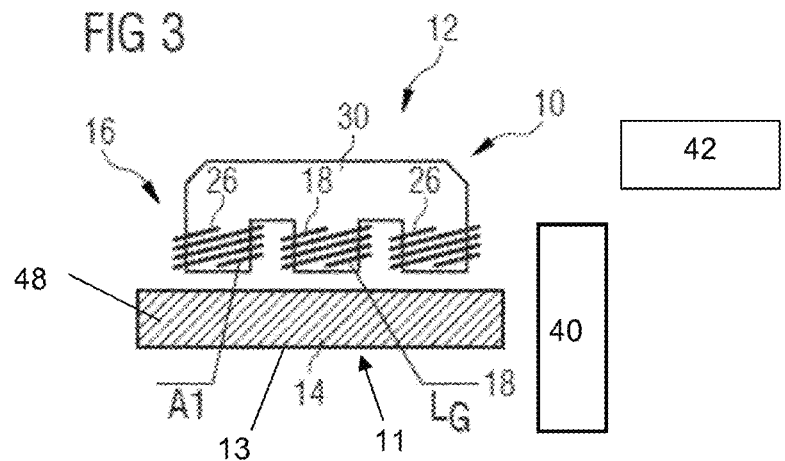
Figure 4:
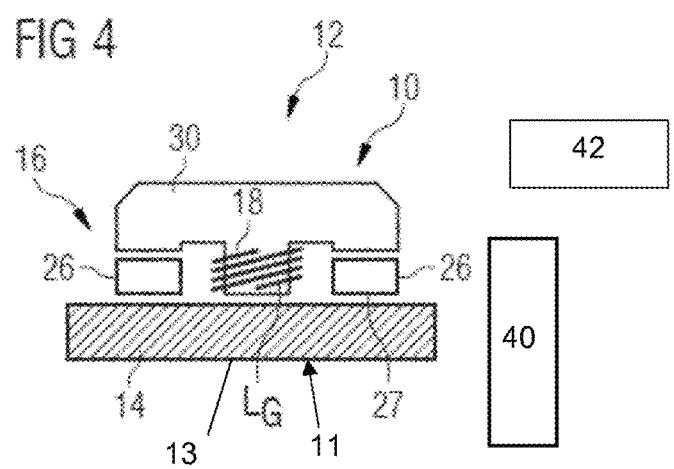
Figure 5:
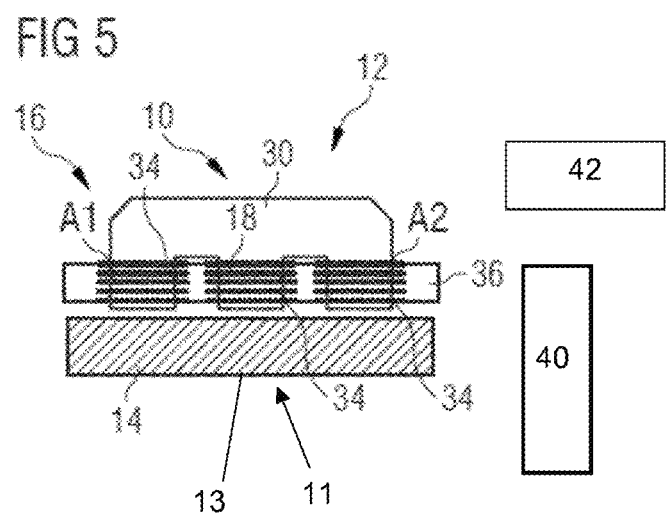
Figure 6:
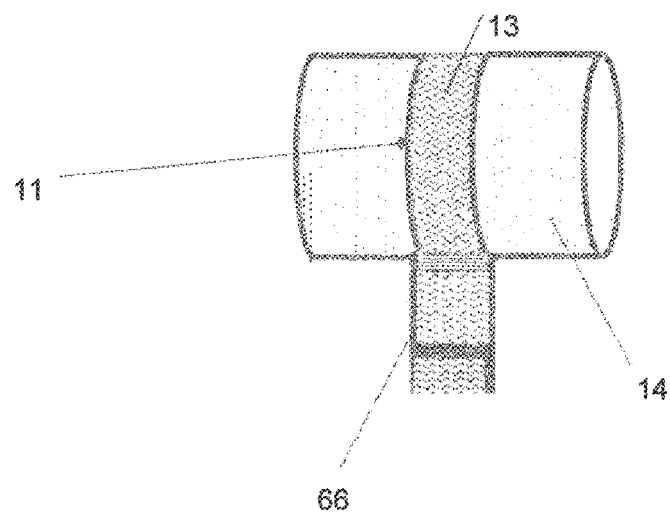
Figure 7:
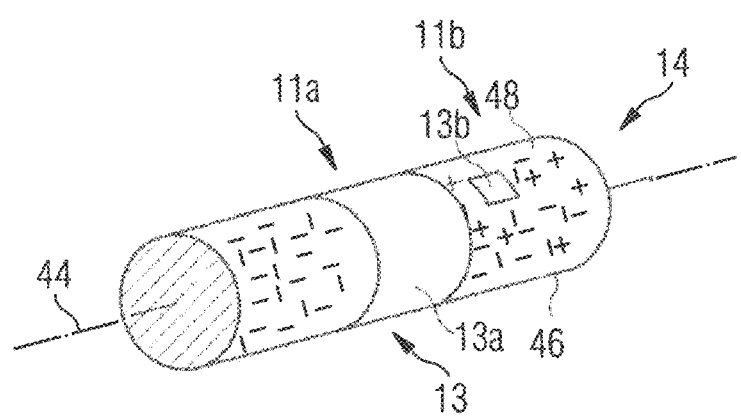
Figure 8:
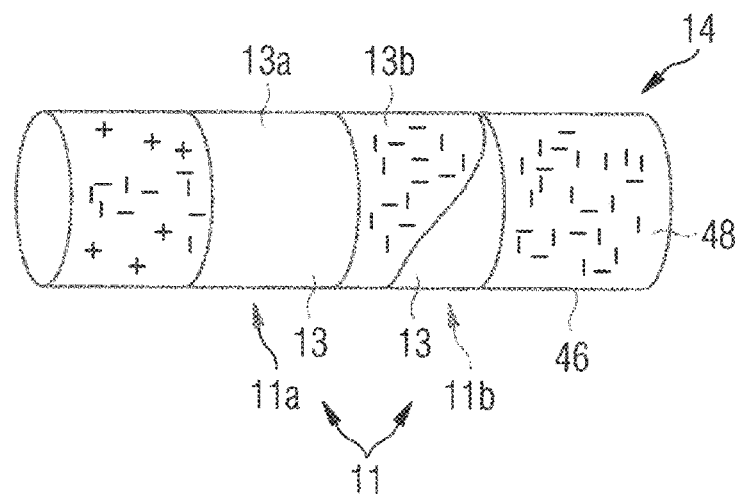
Figure 9:
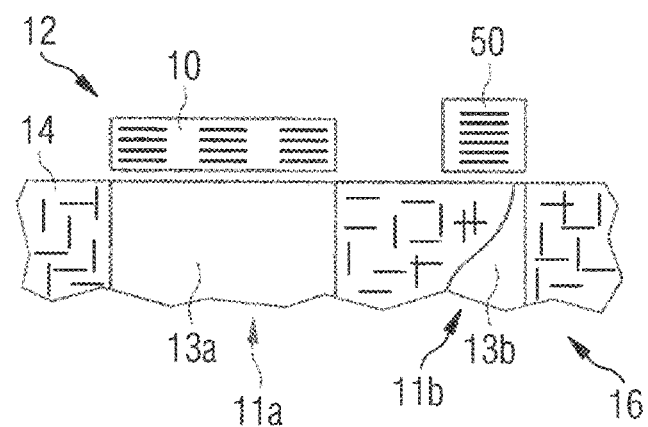
Figures 10, 11:
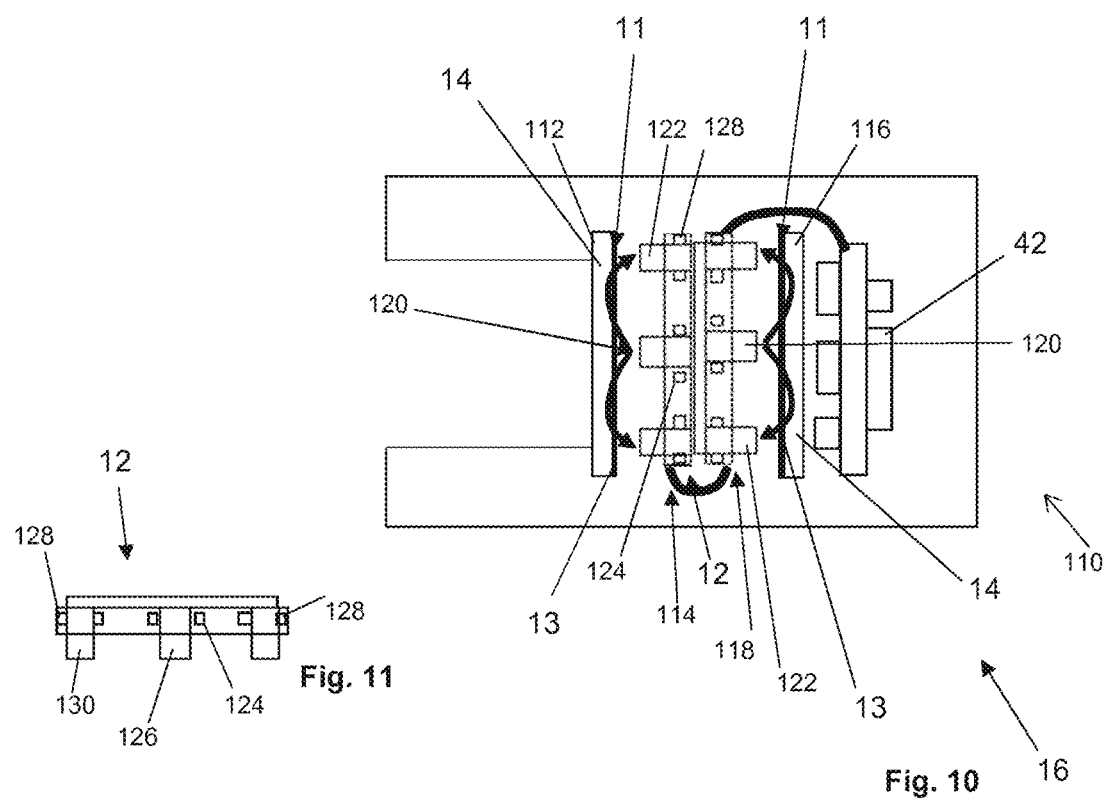

Exemplary embodiments of the invention will be described in more detail in the following with reference to the attached drawings. It is shown by:

FIG. 1 a first preferred embodiment of a sensor head of a load measuring apparatus for measuring a mechanical load such as force, tension or torque at a test object;

FIG. 2 a second preferred embodiment of the sensor head;

FIG. 3 a side view of the sensor head of FIG. 1 together with the test object;

FIG. 4 a view, similar to FIG. 3, of a further embodiment of the sensor head;

FIG. 5 a view, similar to FIG. 3, of yet another embodiment of the sensor head;

FIG. 6 a schematic view of a step of coating the test object with metallic glass;

FIG. 7 a schematic view of a configuration of the test object with a first and a second measuring region;

FIG. 8 a schematic view of a further configuration of the test object with a first and a second measuring region;

FIG. 9 a schematic view of a load measuring arrangement in which the test object according to FIG. 7 or FIG. 8 is used;

FIG. 10 a schematic view of a pressure sensor as another example of the load measuring arrangement; and FIG. 11 one of the sensor heads of the load measuring apparatus used in the pressure sensor of FIG. 10.

FIG. 1 to FIG. 5 show various embodiments of sensor heads 10 for a load measuring apparatus 12. The load measuring apparatus 12 serves for measuring mechanical loads, such as in particular torques, forces or stress in a test object 14 such as for example a shaft, a gear part, a wheel hub, a chain ring or the like, which test object is partially magnetizable and preferably rotatable about a rotation axis. In other configurations, the test object 14 can also be stationary, e.g. a support or a strut in a support structure, where loads or forces are to be measured. At least in a measuring region 11 the test object 14 is provided with a layer of ferromagnetic metallic glass or ferromagnetic nanocrystalline metal, which will still be described in more detail below. The test object 14 and the load measuring apparatus 12 together form a load measuring arrangement 16.

The load measuring apparatus 12 comprises a magnetic field generating device 18 and several magnetic field capturing devices 20, 22.

In a preferred embodiment, the load measuring apparatus 12 comprises a rotation angle capturing device 40 for capturing a rotation angle of the test object 14 and an evaluation device 42 for reducing the influence on the load measurement caused by rotation angle-dependent effects. The evaluation device 42 is coupled to the rotation angle capturing device 40 and to the magnetic field capturing device 20, 22. The evaluation device 42 is particularly arranged for reducing the RSN using the rotation angle information.

The magnetic field generating device 18 has a generator coil Lg and a driver circuit (not further illustrated) for driving the generator coil Lg.

The magnetic field capturing devices 20, 22 comprise magnetic field sensors 26 in the form of detector coils A1, A2, B1, B2 or solid state magnetic field sensors 27 and an evaluation device 42 for evaluating the signals of the magnetic field sensors 26.

The embodiment of the sensor head 10, which is shown in FIG. 1 with its front side view to be directed to the test object 14, is shown in a lateral view in FIG. 3. This embodiment comprises two first magnetic field sensors 26-1 designed as two first detector coils A1, A2 and two second magnetic field sensors 26-2 designed as two second detector coils B1, B2. The detector coils A1, A2, B1, B2 are provided in a cross-shaped arrangement or X-arrangement 28 on a common flux concentrator 30 from ferromagnetic material.

Centrally arranged is the generator coil Lg—in this case, too on a corresponding projection of the flux concentrator 30, with the first detector coils and the second detector coils B1 and B2 opposing each other.

FIG. 2 shows another embodiment of the sensor head 10 with a V-shaped arrangement 32 where only one first magnetic field sensor 26-1—e.g. the first detector coil A1—and only one second magnetic field sensor 26-1 are arranged at an angle to each other, with the generator coil Lg at the apex of the angle configuration.

As shown by FIG. 4, solid state magnetic field sensors 27 can be arranged instead of detector coils as first and second magnetic field sensors 26-1, 26-2.

FIG. 5 shows one embodiment of the sensor head 10 in which the coils—detector coils A1, A2, B1, B2 and generator coil Lg—are provided as planar coils 34 in a printed circuit board element 36—designed as PCB boards.

The load measuring apparatus 12 according to preferred embodiments implements a new signal processing concept for tapping and processing the signals of the magnetic field sensors 26-1, 26-2 as described and shown in German patent application 10 2017 112 913.8 to which reference is explicitly made for further details.

The test object 14 is provided with a layer of ferromagnetic amorphous or nanocrystalline metal.

Amorphous metals are also referred to as metallic glasses. Glasses are solid materials without a crystalline structure. This means that the atoms do not form a lattice, but are arranged randomly at first sight: there is no long-range order, but at most a short-range order. This structure is called amorphous. A nanocrystalline metal is understood to be a metal which still has very small crystals with maximum particle sizes of less than 1 µm. Experiments have shown that nanocrystalline metals have characteristics comparable to those of corresponding amorphous metals.

Like all glasses, also amorphous or nanocrystalline metals are formed by preventing natural crystallization completely or to a large extent. This can take place, for example, by rapid cooling ("quenching") of the melt so that the atoms are deprived of their mobility before they can take the crystal arrangement. For example, there are known metallic glasses and nanocrystalline metals in the form of alloys of at least two metals that can be rendered amorphous. More common are amorphous or nanocrystalline alloys of only one metal—e.g. Fe—and a so-called glass former—e.g. boron or phosphorus, e.g. in the composition Fe4B.

In one design, the layer of amorphous or nanocrystalline metal is produced as a thin strip from a melt that is poured onto a cooled rotating body of the test object 14 and cools abruptly in the process.

In a further design, a thin amorphous or nanocrystalline layer 13 is obtained by chemical vapor deposition or sputter deposition. In this way, also a selective coating of only a part of the test object 14 can take place.

The amorphous or nanocrystalline atomic arrangement, which is highly unusual for metals, leads to a unique combination of physical characteristics:

Amorphous and nanocrystalline metals are generally harder, more corrosion-resistant and stronger than common metals.

Metallic glasses exhibit among others the typical metallic light reflection and cannot be distinguished by the layman from common metals. The surface can be polished particularly smooth and does not scratch easily because of the great hardness. This makes it possible to achieve a particularly beautiful and long-lasting gloss.

Metallic glasses are harder than their crystalline equivalents and exhibit high strength. Minor deformations 1%) are purely elastic. This means that the absorbed energy is not lost as deformation energy, but is fully released again when the material springs back.

The corrosion resistance is usually higher than in metals of a comparable chemical composition. The reason therefor is that corrosion mostly attacks at grain boundaries between the single crystals of a metal which do not exist in amorphous metals.

In metals, bonding electrons belong not to one, but to all atoms. Coupled to each other in this manner, they act on each other and spontaneously form magnetically ordered regions in ferromagnetic materials—the Weiss domains. In magnetism, Weiss domains (after the French physicist Pierre-Ernest Weiss) are microscopically small magnetized domains in the crystals of a ferromagnetic substance. The size of these domains reaches from approximately 10 µm to 1000 µm of linear extension. The direction of the magnetization is guided by the crystal lattice of the material. In materials whose particle size corresponds to this order or is even below, all crystallites are single domain particles, i.e. they are not further subdivided into domains. This is the case in amorphous metals, but also in metals having a maximum particle size of less than 1 µm —the nanocrystalline metals. Amorphous and nanocrystalline metals are homogeneous and their magnetic properties are the same in all directions. The magnetization is therefore much easier. This is particularly noticeable when the magnetic field direction changes again. In the case of a metal with a lattice structure, it is often more energy-intensive to restore the original state, a residual magnetization (remanence) remains. Thus, amorphous and nanocrystalline metals exhibit a much lower hysteresis effect.

The hysteresis effect is a particular problem in torque measurements with active magnetization and can lead to measurement errors. In the state of the art in the field of active magnetic sensors of interest here, there have therefore been major efforts to reduce the hysteresis effect. For this purpose, the present designs use the method of coating the measuring region of the test object with a layer of amorphous or nanocrystalline metals.

One way of producing nanocrystalline materials is to heat a metal glass coating to 500 degrees to 600 degrees. Another way is the deposition of electroless nickel.

The production process of amorphous and crystalline metallic glass tapes entails some excellent characteristics. The individual elementary magnets in the material are partially isolated from each other by the non-conducting glass-forming elements so that the resistivity of the material at around 120 to 150 µΩ·cm is about three times higher than that of electrical sheet. Moreover, they are very small, in crystalline metallic glass tapes they are around 10 nm. As a result, eddy current losses are lower than for other crystalline alloys, even at higher frequencies.

In the embodiments of the invention, magnetic amorphous or nanocrystalline metals are used for the layer 13. Thus a coating with one of the best commercially available soft magnetic materials can be achieved. This allows to achieve a layer with excellent ferromagnetic characteristics so that the load measurement can be performed very accurately even with low field strengths. The amorphous or nanocrystalline alloys of the glass formers boron, silicon and phosphorus and the metals iron, cobalt and/or nickel are magnetic, and usually (i.e., when cobalt is not dominant) soft magnetic, i.e. with low coercivity while having high electrical resistivity. Usually the conductivity is metallic, but of the same order of magnitude as in molten metals, namely just above the melting point. This results in low eddy current electrical losses.

Conventional metals typically contract abruptly during solidification. Since solidification as glass is not a first-order phase transition, this volume jump does not occur here. If the melt of a metallic glass fills a shape, it retains this shape during solidification. This is a behavior known, for example, from polymers, where it offers great advantages in processing (e.g. injection molding). Therefore, different materials can be coated well and the layer 13 is still very durable and has little effect on the desired mechanical properties of the material chosen for the test object 14.

In embodiments of the invention, the layer 13 is produced from amorphous or nanocrystalline metal. Preferably, the layer 13 is amorphous or nanocrystalline with a particle size of <1 µm up to amorphous alloys. Preferably, alloys for the formation of ferromagnetic metallic glasses, e.g. in the composition (Fe, Ni, Co) 70-85 (Si, B) 15-30, are used for the production. The composition is to be read as a chemical formula; that is, 70-85 atomic percent of any mixture of iron, cobalt and nickel with 15-30 atomic percent of any mixture of boron and silicon. Such an alloy becomes amorphous or nanocrystalline by very rapid quenching; alternatively, the layer is first made amorphous and then heated to form nanocrystals.

In another exemplary embodiment, $(Fe_{0.68}Dy_{0.07}B_{0.2}Si_{0.05})_{96}Nb_4$ is used in which the iron content is <70 atomic percent.

Other possible materials, also commercially available materials, are e.g.:
Fe78B13Si9 (Metglas 2605 SA 1)
Fe81B13,5Si3,5C2 (Metglas 2605 SC)
Fe66Co18B15Si1 (Metglas 2605 CO)
Co69Fe4Ni1Mo2Si12B12 (Metglas 2705 M)
Co66Fe4B14Si15Ni1 (Metglas 2714 A)
Fe40Ni38B18Mo4 (Metglas 2826 MB)
Co66Fe4B12Si16Mo2 (Vitrovac 6025)
Co70(FeMo)2Mn5(Sib)23 (Vitrovac 6030)

Preferably, the material of the layer 13 contains glass formers, in particular Si, B and/or P. Accordingly, nanocrystalline ferromagnetic materials used in execution examples also preferably contain glass formers. A concrete example would be Fe91Zr7B3, which has a typical particle size of 17 nm. Preferably, the alloy contains atomic percentages of Si, B and P in the range of 2 . . . 30 atomic percent.

In one embodiment of the corresponding materials, the aforementioned alloys are applied to the measuring region by processes known for the production of metallic glasses.

As explained above, layers 13 of metallic glass can be applied to a body 48 of the test object 14 in various ways, and the body 48 can be formed from quite different materials, in particular non-ferromagnetic materials.

In FIG. 6, a currently preferred embodiment of a process step for producing the test object 14 provided with the layer 13 is explained.

Here, a bath 66 is provided for selectively coating a body 48 of the test object 14. The bath 66 is configured such that only the partial region to be coated, for example the measuring region 11, is wetted by the bath 66. The bath 66 is designed to deposit electroless nickel. Electroless nickel, in particular with a phosphorus content of 5 to 9% by weight, is deposited on the body 48 in such a way that amorphous metal is formed as a layer 13. Such selective electroless nickel plating is offered by various service providers on the market.

In an embodiment not shown in more detail, the body 48 of the test object is completely immersed in a correspondingly larger bath 66. This provides the entire surface of the body 48 with the layer 13 of amorphous electroless nickel.

In both cases, no heat treatment or at most a very moderate heat treatment is subsequently carried out.

For example, as shown in FIGS. 7 and 8, the test object 14 can be a shaft 46 rotatable about an axis of rotation 44.

A first measuring region 11a on the test object 14 that is rotatable about the axis of rotation 44 relative to the load measuring device 12 is provided with a first layer 13a of amorphous or nanocrystalline metal. The first layer 13a extends circumferentially over the entire circumferential area around the test object 14 and is provided uniformly around the entire circumferential area.

On a second measuring region 11b axially offset from the first measuring region 11a with respect to the axis of rotation 44, a second layer 13b of amorphous or nanocrystalline metal is provided which is applied only partially at a circumferential region, as shown in FIG. 7, or is provided such that a magnetic field-influenced parameter of the layer 13b changes depending on the circumferential position. For example, the width of the layer changes depending on the circumferential position, as shown in FIG. 8.

The test object 14 has a body 48 on which the layer 13, 13a, 13b is provided. The body 48 is also made of non-ferromagnetic material, such as aluminum, stainless steel, or as shown, a fiber composite material such as GFRP or CFRP.

FIG. 9 shows the load measuring arrangement 16 with the test object 14 according to one of the FIG. 7 or 8.

The load measuring apparatus 12 can have one of the sensor heads 10 as described above with reference to FIGS. 1 to 5 and at least one additional coil 50. In one embodiment, several additional coils 50 are provided around the test object 14. Electric current is passed through this additional coil 50, and the impedance of the or every additional coil 50 is captured. If the partially provided second layer 13b of FIG. 7 moves past the additional coil 50, the impedance of the coil 50 changes. The impedance of the additional coil 50 is dependent on the covering of the coil with the layer 13b of amorphous or nanocrystalline metal.

When the test object 14 of FIG. 8 is used, the impedance of the respective additional coil 50 changes correspondingly, depending on the width of the region of the layer 13 currently situated on the coil 50. In this manner, a speed information or angle information can be obtained.

For example, the mechanical power can be captured directly by means of the speed information or angle information and the torque. As shown in the earlier German patent application 10 2018 113 378.2, to which explicit reference is made for further details, this can also be used to achieve RSN compensation very effectively.

The sensor head 10 and the at least one additional coil 50 can be supported on a common holder 52 of the load measuring apparatus 12.

In the embodiments shown in FIGS. 1 to 9, a rotating test object 14 is provided. But the test object 14 can also be any test object 14 where loads are to be measured. For example, the test object 14 could also be a membrane 112 or a pressure sensor 110, as shown in FIG. 10. Accordingly, the pressure sensor 110 is another example of an embodiment of the load measuring arrangement 16.

FIG. 10 and FIG. 11 show one embodiment of a pressure sensor 110 which comprises at least one membrane to which a pressure is to be applied, here in the form of a first membrane 112, and a magnetoelastic stress capturing device, here in the form of a first magnetoelastic stress capturing device 114 for magnetoelastic detection of mechanical stress caused by the application of pressure. In the illustrated embodiments, a magnetoelastic stress capturing device is provided that works with active magnetization.

In the illustrated embodiments, the membrane to which pressure is to be applied is a first membrane 112, and mechanical stresses caused by applying pressure to the first membrane 112 are captured by a first magnetoelastic stress capturing device 114.

In preferred embodiments, there is further arranged a second membrane 116, and a second magnetoelastic stress capturing device 118 of the second membrane 116 is assigned in a manner analogous to the magnetoelastic stress capturing device 114 of the first membrane 112. Thus a particularly accurate differential measurement can be achieved.

In the illustrated embodiments, the at least one membrane 112, 116 is formed of a body 48 which is provided with the layer 13 of ferromagnetic amorphous or nanocrystalline metal at least in the measuring region 11. Thus the membrane 112, 116 is formed in a surface region of a ferromagnetic material, and the correspondingly associated magnetoelastic stress capturing device 114, 118 is adapted to capture the stress in the associated membranes 112, 116 magnetoelastically. Due to the coating with the amorphous or nanocrystalline material, the material of the main body of the membrane 112, 116 can be chosen corresponding to the desired characteristics of the pressure sensor 110. The membrane 112, 116 could be formed, for example, of ceramic or especially of stainless steel.

The first and the second magnetoelastic stress capturing devices 114, 118 have an analogous structure, and only the first magnetoelastic stress capturing device 114 will be used to describe their common structure in more detail with reference to FIG. 11.

The magnetoelastic stress capturing device 114, 118 has at least one magnetic field generating device 120 for generating a magnetic field flux passing through the region where stresses are to captured. The magnetoelastic stress capturing device 114, 118 further includes a magnetic field flux capturing device 122 for capturing a magnetic field flux in the region in which mechanical stresses must be captured.

Changes in mechanical stress on a surface of a body formed in particular from a soft magnetic material lead to permeability changes due to the magnetoelastic effect and thus to changes in a magnetic flux induced in the surface. This effect is exploited in the illustrated pressure sensor 110 in order to directly capture stresses in the membrane 112, 116 to which pressure is applied. These stresses are a measure of the pressure acting on the membrane.

Unlike pressure sensors which measure an excursion of the diaphragm, the pressure sensor 110 measures stress in the diaphragm. Accordingly, the membrane 114, 116 does not have to make an excursion in order to generate a signal. Accordingly, the diaphragm 114, 116 can be made thick. Thus a pressure sensor 110 with a very large measuring range can be created.

Accordingly, the magnetic field generating device 120 is designed to generate a magnetic flux passing through the region of the associated diaphragm 112, 116 at which stresses are to be captured, and the magnetic field flux capturing device 122 is designed to detect changes to the magnetic field flux caused by mechanical stresses, such as in particular changes in direction of the magnetic flux lines.

The magnetic field generating device 120 includes at least one excitation coil 124 and an excitation coil core 126. The magnetic field flux capturing device 122 has at least one measuring coil 128 and one measuring coil core 130. The arrangement may be analogous to the sensor heads shown in FIGS. 1 to 5.

For further details on the structure of the magnetoelastic stress capturing device 114, 118, reference is made to DE 10 2016 122 172 A1.

For further details concerning the pressure sensor 110 and its possible variations, embodiments, functions, uses and advantages, reference is made to the non-prepublished German patent application 10 2017 104 547.3.

LIST OF REFERENCE SIGNS

10 sensor head
11 measuring region
11a first measuring region
11b second measuring region
12 load measuring apparatus
13 layer of ferromagnetic amorphous or nanocrystalline metal
13a first layer
13b second layer
14 test object
16 load measuring arrangement
18 magnetic field generating device
20 first magnetic field capturing device
22 second magnetic field capturing device
26 magnetic field sensor
26-1 first magnetic field sensor
26-2 second magnetic field sensor
27 solid state magnetic field sensor
28 X-arrangement
30 flux concentrator
32 V-arrangement
34 planar coil
36 circuit board element
40 rotation angle capturing device
42 evaluation device
44 rotation axis
46 shaft
48 body
110 pressure sensor
112 first membrane
114 first magnetoelastic stress capturing device
116 second membrane
118 second magnetoelastic stress capturing device
120 magnetic field generating device
122 magnetic field flux capturing device
124 excitation coil
126 excitation coil core
128 measuring coil
130 measuring coil core

The invention claimed is:

1. A load measuring arrangement (16) comprising a test object (14) and a load measuring apparatus for measuring a load at the test object, wherein the load measuring apparatus (12) has a magnetic field generating device (18) for generating a magnetic field in a measuring region (11) of the test object (14) and a first and a second magnetic field capturing device (20, 22) for capturing a magnetic field parameter which changes on account of the load,
   wherein the measuring region (11) has a layer (13) made of a ferromagnetic metal with a maximum particle size less than 1 µm,
   wherein the test object (14) includes a body (48) made of a non-ferromagnetic material or made of a ferromagnetic material with an electrically conducting non-ferromagnetic separating layer, and the layer (13) made of the ferromagnetic metal is coated thereon at least in the measuring region (11), and
   wherein the ferromagnetic metal includes one or more selected from the group consisting of electroless nickel, and a metal alloy including electroless nickel and phosphorus.

2. The load measuring arrangement (16) according to claim 1, characterized in that the body (48) is formed from or with a non-ferromagnetic material from the group consisting of stainless steel, aluminum, plastic, fiber-reinforced plastic, GFRP, and CFRP.

3. The load measuring arrangement (16) according to claim 1, characterized in that
   5.1 the layer (13) of the ferromagnetic metal is only partially provided on the test object (14) and/or
   5.2 the layer (13) of the ferromagnetic metal includes a two-dimensionally continuous layer without interruptions where both the magnetic field generating device (18) and the one first and one second magnetic field capturing device (20, 22) are arranged.

4. The load measuring arrangement (16) according to claim 3, characterized in that
   the test object (14) is rotatable about a rotation axis (44) relative to the load measuring device (12), and
   the measuring region (11) includes a first measuring region (11a) and a second measuring region (11b), wherein the first measuring region (11a) has a first layer (13a) of the ferromagnetic metal which uniformly and continuously extends in the circumferential direction with respect to the rotation axis (44) and a second layer (13*b*) of said ferromagnetic metal in the second measuring region (11*b*) that is axially displaced to the first measuring region (11*a*) in the direction of the rotation axis (44), and wherein the second layer is only provided on a part of the circumference and/or has a magnetic field-influencing material parameter which changes depending on the circumferential position.

5. The load measuring arrangement (16) according to claim 1, characterized in that the test object (14) is rotatable about a rotation axis (44) relative to the load measuring device (12).

6. The load measuring arrangement (16) according to claim 1, characterized in that the load measuring apparatus (12) has a sensor head (10) which
   8.1 includes a magnetic field generating coil, a first magnetic field measuring coil and a second magnetic field measuring coil in a V-arrangement (32) or
   8.2 includes a magnetic field generating coil and a first to fourth magnetic field measuring coil in an X-arrangement (28).

7. The load measuring arrangement (16) according to claim 1, characterized in that the magnetic field generating device (18) is designed for actively generating a radial magnetic field in the measuring region of the test object.

8. The load measuring arrangement (16) according to claim 1, characterized in that the load measuring arrangement (16) is designed as a pressure sensor (110) with at least one membrane (112, 116) as the test object (14).

9. A method for producing the load measuring arrangement (16) according to claim 1, characterized by
   a) providing a test object (14) made from a non-ferromagnetic material or providing a ferromagnetic test object having a non-ferromagnetic electrically conducting separating layer,
   b) at least partially coating the test object (14) with a ferromagnetic metal having a maximum particle size of less than 1 μm in order to form a measuring region (11),
   c) providing a load measuring apparatus (12) having a magnetic field generating device (18) for generating a magnetic field in the measuring region (11) of the test object (14) and a first and a second magnetic field capturing device (20, 22) for capturing a magnetic field parameter which changes on account of the load in the measuring region (11), and
   d) arranging the load measuring apparatus (12) at the measuring region (11).

10. The method according to claim 9, characterized in that step b) comprises at least one or more of the following steps:
    b1) depositing chemically an alloy of at least one glass former and at least one metal having ferromagnetic properties on the test object (14), wherein the deposition takes place so quickly that the ferromagnetic metal having a maximum particle size of less than 1 μm is formed;
    b2) depositing electroless nickel with a phosphorus content of 2 to 12% by weight, preferably 5 to 9% by weight;
    b3) coating with a layer thickness greater than 10 μm, in particular between 10 μm and 500 μm;
    b4) coating a circumferential region of the test object (14) which is all-round with respect to an axis of the test object (14);
    b5) partially coating a circumferential region of the test object (14) which is all around with respect to an axis of the test object (14);
    b6) producing a circumferential position signature at a circumferential position on the test object (14) by partial application of the coating, by texturing the coating or by producing the coating (13*b*) with a magnetic field-influencing material parameter changed at this circumferential position;
    b7) producing a two-dimensionally continuous layer without interruptions;
    b8) depositing a metallic glass;
    b9) depositing an alloy which at least includes one metal from the group of iron, nickel, cobalt and molybdenum;
    b10) depositing an alloy which at least includes one glass former;
    b11) depositing an alloy which at least includes one glass former from the group of silicon, boron and phosphorus;
    b12) depositing an alloy including 2 to 30 atomic percent of at least one glass former, particularly from the group of silicon, boron and phosphorus;
    b13) depositing an alloy which contains 65 to 95 atomic percent of one or more metals from the group of iron, cobalt and nickel and 5 to 35 atomic percent of one or more glass formers from the group of silicon, boron and phosphorus.

11. A load measuring method for measuring a load at a test object (14) made from a non-ferromagnetic material, comprising:
    coating at least one measuring region (11) of the test object (14) with a ferromagnetic metal having a maximum particle size of less than 1 μm,
    actively generating a magnetic field in the measuring region, and
    capturing a change in the magnetic field parameter on account of the load at the test object (14),
    wherein the method is performed using the load measuring arrangement according to claim 1, or a load measuring arrangement obtainable with a production method comprising:
    a) providing a test object (14) made from a non-ferromagnetic material or providing a ferromagnetic test object having a non-ferromagnetic electrically conducting separating layer,
    b) at least partially coating the test object (14) with a ferromagnetic metal having a maximum particle size of less than 1 μm in order to form a measuring region (11),
    c) providing a load measuring apparatus (12) having a magnetic field generating device (18) for generating a magnetic field in the measuring region (11) of the test object (14) and a first and a second magnetic field capturing device (20, 22) for capturing a magnetic field parameter which changes on account of the load in the measuring region (11), and
    d) arranging the load measuring apparatus (12) at the measuring region (11).

12. The load measuring method according to claim 11, characterized in that the magnetic field is generated radially with respect to an axis of rotation.

13. The load measuring arrangement (16) according to claim 1, characterized in that 2 to 12% of phosphorus is included by weight in the ferromagnetic metal.

14. The load measuring arrangement (16) according to claim 13, characterized in that 5 to 9% of phosphorus is included by weight in the ferromagnetic metal.

15. A load measuring method for measuring a load at a test object (14) made from a non-ferromagnetic material, comprising:

coating at least one measuring region (11) of the test object (14) with a ferromagnetic metal having a maximum particle size of less than 1 µm, actively generating a magnetic field in the measuring region, and capturing a change in the magnetic field parameter on account of the load at the test object (14), wherein the ferromagnetic metal includes one or more selected from the group consisting of electroless nickel, and a metal alloy including electroless nickel and phosphorus.

16. The load measuring method according to claim 15, characterized in that the magnetic field is generated radially with respect to an axis of rotation.

\* \* \* \* \*